United States Patent
Jongsma et al.

(10) Patent No.: US 11,383,807 B2
(45) Date of Patent: Jul. 12, 2022

(54) UNDERWATER OBSERVATION UNIT AND SYSTEM

(71) Applicant: FNV IP B.V., Leidschendam (NL)

(72) Inventors: Arnoud Marc Jongsma, Vijfhuizen (NL); Dennis Van Weeren, Leidschendam (NL); Aris Lubbes, Leidschendam (NL)

(73) Assignee: FNV IP B.V.

(*) Notice: Subject to any disclaimer, the term of this patent is extended or adjusted under 35 U.S.C. 154(b) by 342 days.

(21) Appl. No.: 16/630,390

(22) PCT Filed: Jul. 11, 2018

(86) PCT No.: PCT/NL2018/050466
§ 371 (c)(1),
(2) Date: Jan. 10, 2020

(87) PCT Pub. No.: WO2019/013627
PCT Pub. Date: Jan. 17, 2019

(65) Prior Publication Data
US 2021/0086884 A1    Mar. 25, 2021

(30) Foreign Application Priority Data
Jul. 11, 2017 (NL) .................................. 2019223

(51) Int. Cl.
  *B63C 11/52* (2006.01)
  *G01C 11/02* (2006.01)
  (Continued)

(52) U.S. Cl.
  CPC .............. *B63C 11/52* (2013.01); *G01C 11/02* (2013.01); *G01C 13/00* (2013.01);
  (Continued)

(58) Field of Classification Search
  USPC .................. 73/170.29; 396/427; 348/81, 143
  See application file for complete search history.

(56) References Cited

U.S. PATENT DOCUMENTS 5,418,608 A * 5/1995 Caimi .................... G01S 17/89
                                                  356/3.01
5,528,493 A * 6/1996 Potter .................. G01C 13/004
                                                     702/3
(Continued)

FOREIGN PATENT DOCUMENTS

GB      2257250 A     1/1993
WO   2014060562 A1    4/2014
(Continued)

OTHER PUBLICATIONS

International Search Report and Written Opinion; PCT Application No. PCTNL2018/050466; dated Sep. 11, 2018.

*Primary Examiner* — Clayton E. LaBalle
*Assistant Examiner* — Warren K Fenwick
(74) *Attorney, Agent, or Firm* — Polsinelli PC

(57) ABSTRACT

An observation unit (30) for underwater deployment on/in a submerged earth layer (12) or structure. The unit comprises a housing (32), a light source (36), an underwater imaging device (40), a processor device (44), and a communication device (35). The housing supports the underwater observation unit relative to the submerged layer or structure. The light source is fixed to the housing, and configured to emit light into the unit's surroundings. The imaging device is attached to the housing, and configured to acquire image data of a second light source located within a FOV of the camera that covers the surroundings of the unit. The processor device is configured to determine positional data of the second light source relative to the imaging device, from the image data. The communication device is configured to transmit the positional data to another underwater observation unit, an underwater vehicle, or an underwater processing station.

17 Claims, 6 Drawing Sheets

(51) Int. Cl.
*G01C 13/00* (2006.01)
*G03B 15/04* (2021.01)
*H04N 5/225* (2006.01)
*G03B 17/08* (2021.01)

(52) U.S. Cl.
CPC ....... *G03B 15/0405* (2013.01); *H04N 5/2256* (2013.01); *G03B 17/08* (2013.01); *H04N 5/2254* (2013.01)

(56) References Cited

U.S. PATENT DOCUMENTS

| | | | |
|---|---|---|---|
| 6,366,533 B1 * | 4/2002 | English | H04B 11/00 367/131 |
| 7,940,444 B2 * | 5/2011 | Dalgleish | G02B 26/123 359/216.1 |
| 2016/0121009 A1 * | 5/2016 | Farr | H04B 10/80 250/492.1 |
| 2021/0152259 A1 * | 5/2021 | Jongsma | H04B 10/112 |

FOREIGN PATENT DOCUMENTS

| | | | | |
|---|---|---|---|---|
| WO | WO-2014060562 A1 * | 4/2014 | | B60R 1/00 |
| WO | 2014071291 A2 | 5/2014 | | |
| WO | WO-2014071291 A2 * | 5/2014 | | H04N 5/2259 |
| WO | 2015162280 A1 | 10/2015 | | |
| WO | WO-2015162280 A1 * | 10/2015 | | G06T 7/521 |
| WO | 2016068715 A1 | 5/2016 | | |
| WO | WO-2016068715 A1 * | 5/2016 | | B63C 7/26 |
| WO | 2019013627 A1 | 1/2019 | | |

\* cited by examiner

UNDERWATER OBSERVATION UNIT AND SYSTEM

CROSS-REFERENCE TO RELATED APPLICATIONS

This application is a national stage application of International Application No. PCT/NL2018/050466, which was filed on July 11, 2018, which claims priority to Netherlands Application Number 2019223 filed on July 11, 2017, of which is incorporated by reference in its entirety.

TECHNICAL FIELD

The invention relates to an underwater observation unit, to a system for underwater observation comprising a plurality of such units, and to underwater monitoring methods using such a system. Furthermore, the invention relates to computer program products arranged to perform the methods, and a computer readable medium comprising such a computer program.

BACKGROUND ART

Structural failure in components of man-made assets that are located underwater in or on a submerged earth layer may have serious environmental and/or financial consequences. An example of a valuable asset is a subsea oil extraction system, which is arranged on a seafloor and typically includes wellheads, trees, production manifolds, interconnecting jumpers, and production risers. It is challenging but critical to monitor the structural integrity of such a system at all stages of its life cycle.

Displacement or deformation of asset components may have various causes. The geometry of the sea- or ocean floor may for instance change due to plate tectonic effects, volcanic activity, mining, and gas or oil extraction. In addition, asset components may subside into soft sediments due to gravitational pull, or other forces acting on the component (e.g. forces exerted by an anchor chain on a suction pile anchor). Also, temperature changes may give rise to stresses and positional changes between interconnected asset components. It may be desirable to monitor positional changes of the asset components and/or the surrounding submerged earth layer in time, to allow timely detection of excessive displacement of particular regions, so that necessary precautions may be taken to prevent potential damage to the asset components.

To be able to timely detect unwanted deformations within such submerged system, it is critical that deformations of and relative motions between structure components are observed in time. Measurement accuracies in the order of centimeters or less may be required to provide a timely indication of undesired positional changes.

Various underwater monitoring devices are known with sensors for observing spatial properties of underwater structures and their surroundings. Subsea monitoring devices should preferably be self-powered, energy efficient, and able to function autonomously for a prolonged time, to reduce the required deployment and collecting operations to a minimum. In deep sea environments with typical ocean floor depths in the order of several kilometers, the sensors must additionally be able to withstand pressures of several hundred bars.

International patent publication WO2016/068715A1 describes underwater positioning systems configured to provide position information for a remotely operable vehicle (ROV). One system includes underwater beacons, each with an imaging device that observe light sources on a moving ROV and determines direction data representing a direction or change in direction of the ROV light sources with respect to the imaging device.

It would be desirable to provide a versatile underwater observation unit, which can be deployed together with similar units to form a versatile system that enables various underwater observation and monitoring tasks with improved accuracy. Alternatively or in addition, it may be desirable to provide an underwater observation unit that can be deployed underwater for a prolonged time.

SUMMARY OF INVENTION

Therefore, according to a first aspect, there is provided an observation unit for underwater deployment on or in a submerged earth layer or a submerged structure. The observation unit comprises a housing, a light source, an underwater imaging device, a processor device, and a communication device. The housing is adapted for supporting the underwater observation unit relative to the submerged surface or structure. The light source is fixed to the housing, and is configured to emit light into the surroundings of the observation unit. The underwater imaging device is attached to the housing, and is configured to acquire image data of a second light source located within a wide field of view (FOV) of the imaging device, which covers the surroundings of the observation unit. The processor device is configured to receive the image data from the imaging device, and to determine positional data of the second light source relative to the imaging device. The communication device is configured to transmit the positional data to another underwater observation unit, and/or to an underwater vehicle or processing station.

The proposed underwater observation unit includes an imaging device, which is configured to image the surroundings of the observation unit over a wide range, e.g. by using a fisheye lens, and a light source for emitting light that can be observed by other nearby observation units. By using a plurality of such observation units, the light sources and imaging devices can cooperate to provide images and/or positional data of each other and objects in the vicinity. The proposed unit can be easily deployed in submerged (e.g. subsea) environments for a long term (e.g. years), and configured to acquire measurements at desired periods and at desired update rates.

According to an embodiment, the communication device comprises an optical signal transmitter, and the light source is part of the optical signal transmitter. This transmitter is configured to emit a data signal via the emitted light into the surroundings of the observation unit.

The small carrier wavelengths for optical data signals allows construction of small units and communication components with high resolution (e.g. a factor 10,000 compared to acoustics), low latency, and fast update rates. The light source can be efficiently used for data communication between this observation unit and another unit or nearby vehicle, as well as for imaging and position detection by imaging devices of observation units it the vicinity.

According to embodiments, the observation unit comprises an orientation sensor, which is configured to determine attitude data including at least a pitch and a roll of the underwater imaging device relative to the submerged surface or structure when the observation unit is in a deployed state.

The orientation sensor may for instance be an inclinometer, which is configured to acquire instantaneous attitude measurements (e.g. at least pitch and roll) for the observation unit. Angular measurement accuracy of 0.01° may be achievable. The orientation sensor may comprise or be coupled to a memory unit configured to record the attitude data with time stamps.

According to embodiments, the underwater imaging device is formed by an omnidirectional photogrammetric camera with an ultra-wide FOV, preferably with an azimuthal coverage of 360° and an elevational coverage of at least −20° to +30°, for instance of −20° to 90°, or even of −50° to 90°.

The term "omnidirectional" is used herein to refer to a camera that is configured to receive image data from any or all directions in an azimuthal plane that is orthogonal to a nominal axis onto which the camera is centered, i.e. has an azimuthal coverage of 360°. The FOV of the camera may be limited along the elevational direction, and/or its reception sensitivity may change with increasing elevation angle above or below the azimuthal plane. For a displacement monitoring mode, an elevational coverage ranging at least from −20° to +30° may already suffice. A single image detector may be efficiently used in combination with a fisheye lens with an ultra-wide FOV of 360°×220°, in order to acquire single photogrammetric images of a large portion of the surroundings of the observation unit.

According to a further embodiment, the housing is centered on a nominal axis, and the underwater imaging device is located on one distal portion of the housing, with its FOV facing away from the submerged surface or structure when the observation unit is in a deployed state. In particular, the underwater imaging device may be attached on a distal end of the housing that is upwards when the unit is in use, to provide optimal visual coverage of the surroundings.

In embodiments, the light source comprises a LED that is adapted for emitting light with wavelengths substantially in a range of 300 nanometers to 600 nanometers.

The use of active light sources (e.g. LEDs), also for inter-unit position monitoring, increases the maximum detection range significantly, as opposed to reflected light (e.g. by a factor of five or more in clear ocean water). Propagation of light underwater is nevertheless severely limited compared to propagation in air or free space. Preferably, the emission properties of the LED light sources are tailored to the optical transmission properties of the water in which the observation unit is deployed. In sea water, only green to blue light will propagate a substantial distance (tens to hundreds of meters) without being attenuated beyond practical use. For subsea operation, green or blue LEDs (e.g. light wavelengths ranging from 420 nanometers to 520 nanometers and an intensity maximum between 460 and 480 nanometers) may be most suitable. For coastal water with a considerable pollution level, longer LED emission wavelengths (e.g. tending towards the yellow part of the optical spectrum) may be preferred.

In embodiments, the underwater imaging device comprises a digital imaging sensor and refractor optics. The imaging sensor includes a two-dimensional (2D) array of pixels. The refractor optics may for instance be formed by a fish-eye lens, and has a focal length that slightly exceeds a distance to the imaging sensor. This focal length ensured that point-like light from a second light source that is located within the wide FOV of the underwater imaging device (e.g. a signal transmitter from another unit at a location remote from the observation unit), is imaged out of focus to generate a blob that extends over at least one or preferably multiple adjacent pixels of the array.

A remote point-like light source (i.e. LED) will illuminate less than one pixel of an image sensor array in a properly focused camera system, which renders determination of subpixel coordinates impossible. For the purpose of determining center coordinates of the remote light source, defocusing will cause the impinging light to cover several (e.g. at least two) pixels of the sensor array to enable subpixel detection, and hence a more accurate estimate of the direction of the light source.

In further embodiments wherein the underwater imaging device is configured to acquire more sophisticated image data (e.g. acquiring photographs, or laser striping data of the unit's surroundings), the refractor optics may be adapted to selectively adjust its focal length, in order to allow migration of the imaging focal point between a location slightly behind the digital imaging sensor, such that point-like light from the second light source is imaged out of focus (e.g. operation in positioning mode), and a location coinciding with the imaging sensor, such that the surrounding scene is imaged in focus (e.g. operation in photographic mode).

In embodiments, the observation unit comprising a memory unit for storing the positional data with timestamps, to form a dataset of time-dependent positional data.

According to embodiments, the underwater imaging device is configured to acquire further image data of a third light source located within the FOV of the underwater imaging device. The second light source and the third light source may be activated in a directly successive but temporally non-overlapping manner. The processor device may then be configured to receive from the imaging device the image data associated with the second light source, and the further image data associated with the third light source, and to subtract the image data from the further image data or the further image data from the image data, to generate distinguishable image intensity extrema for the second and third light sources while reducing or eliminating background information.

The image subtraction method increases the robustness of the positioning measurements, by removing (irrelevant) background image data and simultaneously transforming the light source signals into local regions with extreme values of opposite sign (relative to an average background value). This simplifies spatial detection and discrimination of the light source signals in the acquired images.

According to a second aspect, and in accordance with advantages and effects described herein above with reference to the first aspect, there is provided an underwater observation system including at least two observation units in accordance with the first aspect. The first and second observation units are adapted for underwater deployment at distinct first and second locations on or in a submerged earth layer or structure. A communication device of the first and/or second observation unit is configured to receive positional data of both the first and second observation units, and a processor device of the first and/or second observation unit is configured to merge received positional data with timestamps, to form a dataset of time-dependent positional profiles for both observation units.

A plurality of such units can be efficiently deployed in a meshed network arrangement, to provide quasi-static structure displacement monitoring functionality with measurement redundancy and considerable reliability (no single point of failure).

According to an embodiment, a memory unit of the first and/or second observation unit is configured to store the dataset of time-dependent positional profiles, and the communication device of the first and/or second observation unit is configured to transmit the dataset of time-dependent positional profiles to an underwater vehicle or an underwater processing station upon request.

A system with two (or more) observation units can be efficiently deployed in a network arrangement (e.g. a meshed network), which allows an underwater vehicle (e.g. ROV, UAV) to approach a single observation unit of the network and download network measurements via this single unit.

In embodiments, an underwater imaging device of at least one of the first and/or second observation unit is configured to acquire further image data of vehicle light sources provided on an underwater vehicle located within the wide FOV of the underwater imaging device. The processor device of the first and/or second observation unit may then be configured to receive the further image data from the imaging device, and to determine further positional data of the underwater vehicle relative to the imaging device. The communication device of the first and/or second observation unit may then then configured to transmit the further positional data to the underwater vehicle upon request.

The underwater observation system may be kept deployed in dormant mode in or on the submerged surface or structure for a long time, but may be woken up by an underwater vehicle entering the site, and ordered to start tracking and broadcasting the 6 DOF position of the vehicle. This removes the need to install and calibrate a separate positioning system on site.

In embodiments, an underwater imaging device of at least one of the first and/or second observation unit is configured to acquire panoramic image data of surrounding objects in the wide FOV of the underwater imaging device. The processor device of the first and/or second observation unit may then be configured to receive the panoramic image data from the imaging device. Further, the communication device of the first and/or second observation unit may then be configured to transmit at least part of the panoramic image data to the underwater vehicle upon request.

The underwater observation system uses multiple static cameras with omnidirectional views, which can be made to record images of the environment at command. The 6 DOF positions of the cameras may be accurately determined in advance by calibration techniques. The cameras may then be used to generate 3D image maps of the environment. The underwater vehicle (e.g. ROV or AUV) could project light onto the otherwise dark scene, and the observation system may be commanded to acquire panoramic images. This projected light may be diffuse light or laser stripes, and allows creation of 3D point cloud data of the environment without the use of additional equipment (e.g. a laser scanner).

In case full images are acquired (diffuse light source), the communication device may transmit the entire panoramic image. Alternatively or in addition, the processor device of the first and/or second observation unit may be configured to perform image processing tasks. The processing device may for instance reduce image content to those portions of the scene that contain light (and discard the dark content) to limit the data quantity to be transmitted. The processor device may also be configured to extract landmark features from the panoramic image data, and the communication device may then be configured to transmit the extracted features with positional reference data to the underwater vehicle upon request. Landmark features from multiple units may be combined and used to generate 3D point cloud data from the surrounding objects. Such post-processing may for instance be executed by a processor on the requesting underwater vehicle, or on a remote processing station (e.g. on a surface vessel that is coupled to the ROV)

In embodiments, the first and second observation units are configured to operate, upon request by a nearby underwater vehicle, in at least one selected from three operational modes. In a first operational mode, the communication device of the first and/or second observation unit receives positional data of both the first and second observation units, and the processor device of the first and/or second observation unit merges received positional data with timestamps, to form a dataset of time-dependent positional profiles for both observation units. In a second operational mode, the underwater imaging device acquires further image data of vehicle light sources on the underwater vehicle, the processor device receives the further image data from the imaging device, and determines further positional data of the underwater vehicle relative to the imaging device, and the communication device of the first and/or second observation unit transmits the further positional data to the underwater vehicle. In a third operational mode, the underwater imaging device acquires panoramic image data of surrounding objects in the wide FOV of the underwater imaging device, and the communication device transmits the panoramic image data to the underwater vehicle.

The system may be configured to operate in a single mode, and switch to another single mode upon request. The system may also be configured to operate in multiple modes at the same time, and de-activate one of the current modes and/or activate one or more other modes upon request. By providing an underwater observation system with different operational modes, the system may be efficiently used for different purposes and perform alternative measurements upon request, while saving energy when particular modes of operation are not desired.

According to a third aspect, there is provided a method for monitoring a spatial profile of a submerged surface or structure in time, using the underwater observation system according to the second aspect. The method comprises:

deploying the first and second observation units underwater at non-coinciding first and second positions on or along the submerged surface or structure, followed by:

emitting a first light signal with the first light source of the first observation unit towards the second observation unit;

acquiring first image data of the first light signal with a second underwater imaging device of the second observation unit;

emitting a second light signal with the second light source of the second observation unit towards the first observation unit;

acquiring second image data of the second light signal with a first underwater imaging device of the first observation unit;

determining first positional data of the second light source relative to the first imaging device, and second positional data of the first light source relative to the second imaging device, and storing the first and second positional data with timestamps, to form a dataset of time-dependent positional data.

The underwater observation system, when installed on subsea assets, can monitor relative motions between the deployed units and therefore of parts of assets on which the units are deployed. This allows accurate (e.g. sub-centimeter) determination of positional changes of submerged objects and/or surfaces in time. Depending on the acquired image data, up to six degrees of freedom (DOF) motion of the submerged objects or surfaces may be monitored. The method may for instance be used to estimate mechanical stresses between two locations of a submerged object, or of structures (e.g. conduits) interconnecting two submerged objects.

Initial deployment comprises positioning of the first and second observation units at a mutual distance on or along the submerged surface or structure. In a displacement monitoring mode, inter-unit distances of up to 200 meters or more may be achievable. In a dynamic observation mode wherein ROV motion is tracked, inter-unit distances of up to 100 meters may be achievable.

According to a fourth aspect, there is provided a method for using an observation unit including an underwater imaging device with a digital imaging sensor according to claim 7. The method comprises:
providing the underwater imaging device with refractor optics with a focal length that slightly exceeds a distance to the imaging sensor;
acquiring image data by imaging a point-like light from a light source that is located within the FOV of the underwater imaging device out of focus, to generate a blob in the image data that extends over at least one or preferably multiple adjacent pixels of the 2D pixel array of the imaging sensor;
identifying a center of the blob relative to the 2D pixel array, and
determining sub-pixel coordinates for the center of the blob, representative of an angular position of the light source relative to the imaging sensor.

Such a method is believed to be inventive in and of its own right in the context of imaging of and positional determination for a localized light source in the vicinity of an imaging device, and may be subject of a divisional application.

According to a fifth aspect, there is provided a method for using an observation unit including an underwater imaging device with a digital imaging sensor according to claim 9. The method comprises:
activating a second light source located within the FOV of the imaging device, and acquiring image data of the second light source with the imaging device;
activating a third light source located within the FOV of the imaging device, and acquiring further image data of the third light source with the imaging device, wherein the second light source and the third light source are activated in a directly successive but at least partially non-overlapping manner;
subtracting the image data from the further image data or the further image data from the image data, thereby generating distinguishable image intensity extrema for the second and third light sources while reducing or eliminating background information.

Such a method is believed to be inventive in and of its own right in the context of imaging and discriminating multiple localized light sources in the vicinity of an imaging device, and may be subject of a divisional application.

According to a further aspect, there is provided a computer program product configured to provide instructions to carry out a method according to at least one the abovementioned aspects, when loaded on a computer arrangement.

In yet a further aspect, there is provided a computer readable medium, comprising such a computer program product.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the reference number. For example, two instances of a particular element "20" may be labeled as "20a" and "20b". The reference number may be used without an appended letter (e.g. "20") to generally refer to an unspecified instance or to all instances of that element, while the reference number will include an appended letter (e.g. "20a") to refer to a specific instance of the element.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

In the next figures, various coordinate systems will be used to describe spatial characteristics and relations for exemplary embodiments of the observation unit and system. The "unit axis" A refers herein to a nominal axis through an observation unit, and on which an imaging device of the unit is centered. The "axial direction" Z is used herein to refer to the direction along this unit axis A. The term "radial direction" R refers herein to the directions that point radially away from the unit axis A (i.e. perpendicular to the axial direction Z), and which lie in a transversal plane for which a surface normal vector points along the axial direction Z. The "angular direction" (or "azimuthal direction") $\phi$ corresponds to a unit-vector that initiates at a local radial position, and which points anti-clock-wise along an (infinitesimal) angle of rotation about the unit axis A, and perpendicular to both the (local) radial and axial directions R, Z. Any radial-angular plane transverse to the axial direction Z is referred to herein as an "azimuthal plane" $P_\phi$.

The term "surface" is used herein to generally refer to a two-dimensional parametric surface region, which may have either an entirely or piece-wise flat shape (e.g. a plane or polygonal surface), a curved shape (e.g. cylindrical, spherical, parabolic surface, etc.), a recessed shape (e.g. stepped or undulated surface), or a more complex shape. The term "plane" is used herein to refer to a flat surface defined by three non-coinciding points.

It should be understood that the directional definitions and preferred orientations presented herein merely serve to elucidate geometrical relations for specific embodiments. The concepts of the invention discussed herein are not limited to these directional definitions and preferred orientations. Similarly, directional terms in the specification and claims, such as "top," "bottom," "left," "right," "up," "down," "upper," "lower," "proximal," "distal" and the like, are used herein solely to indicate relative directions and are not otherwise intended to limit the scope of the invention or claims.

Figure 1:
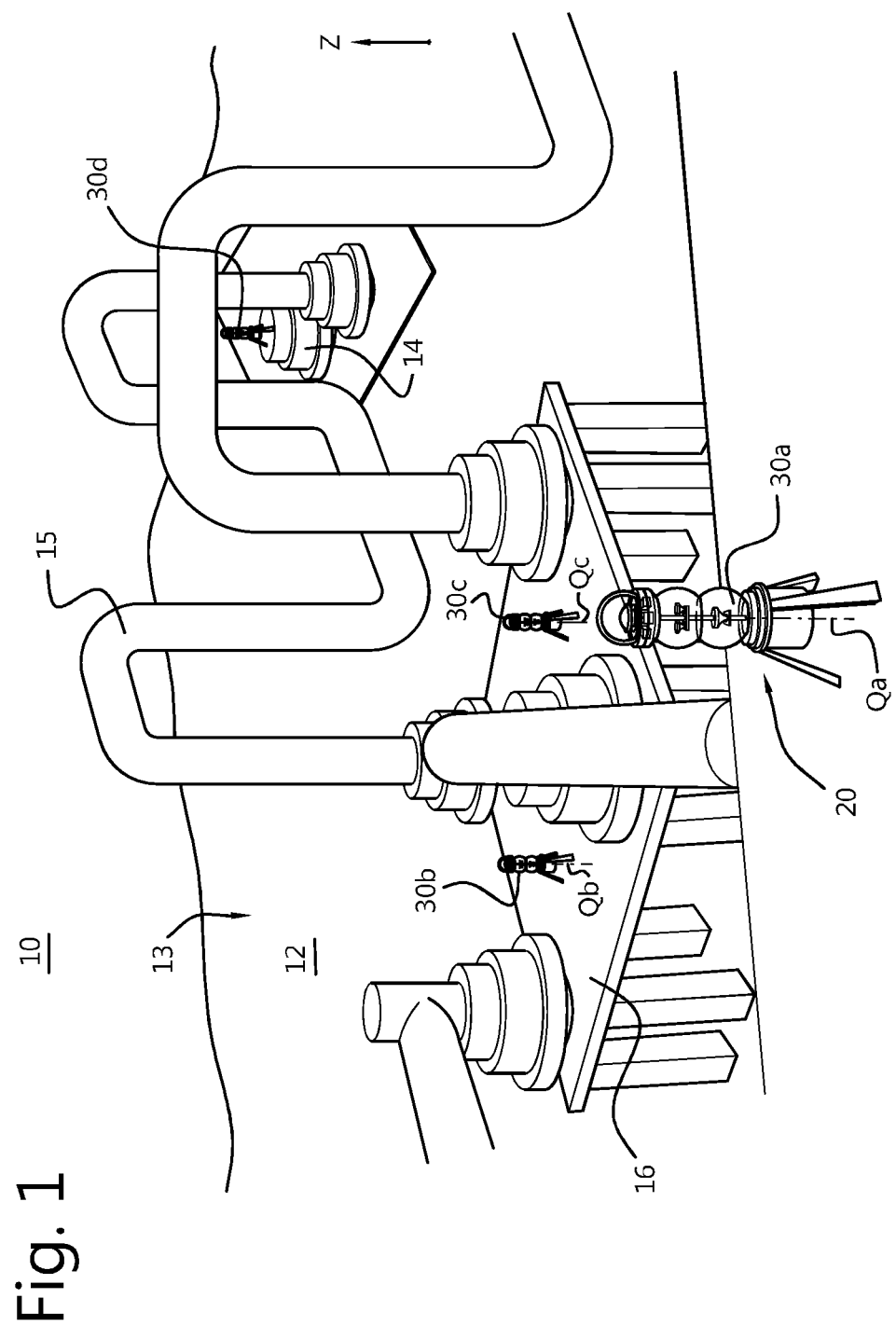
FIG. 1 schematically shows an embodiment of an observation system, deployed underwater on submerged structures and supporting surface.

FIG. 1 schematically shows a perspective view of an exemplary observation system 20 deployed underwater. The system 20 includes a plurality of observation units 30a, 30b, 30c, 30d, which are all immersed in a body of water 10, and are positioned at respective positions Qa, Qb, Qc on submerged structures 14, 16. The submerged structures 14, 16 are arranged across a submerged surface 13, which forms a water-soil interface between the above-situated body of water 10 and the earth layer 12 below. In this example, the submerged surface 13 forms the surface of a portion of a seabed 12, and the submerged structures 14, 16 form part of a subsea oil extraction system, which includes several wellheads 14 and at least one production manifold 16 that is connected to the wellheads 14 via jumpers 15. The surface 13 of the seabed 12 is typically not perfectly planar, but has local height variations with respect to a vertical direction Z (corresponding with gravity).

The observation units 30 include watertight enclosures, and can be deployed in submerged environments for a long term (e.g. years). Once deployed, the units 30 are configured to establish communication channels between pairs of units 30 to form a meshed network. The units 30 are also configured to acquire image data of each other and of the surroundings at desired periods and update rates, and to exchange acquired data via the communication channels.

Although four observation units 30 are illustrated in FIG. 1, it should be understood that a greater or smaller number of units can be employed. An increased number of deployed units in the meshed network arrangement allows a larger and/or denser spatial coverage, and may provide increased measurement redundancy which may be exploited to improve measurement accuracy and reliability of the system 20.

Figure 2:
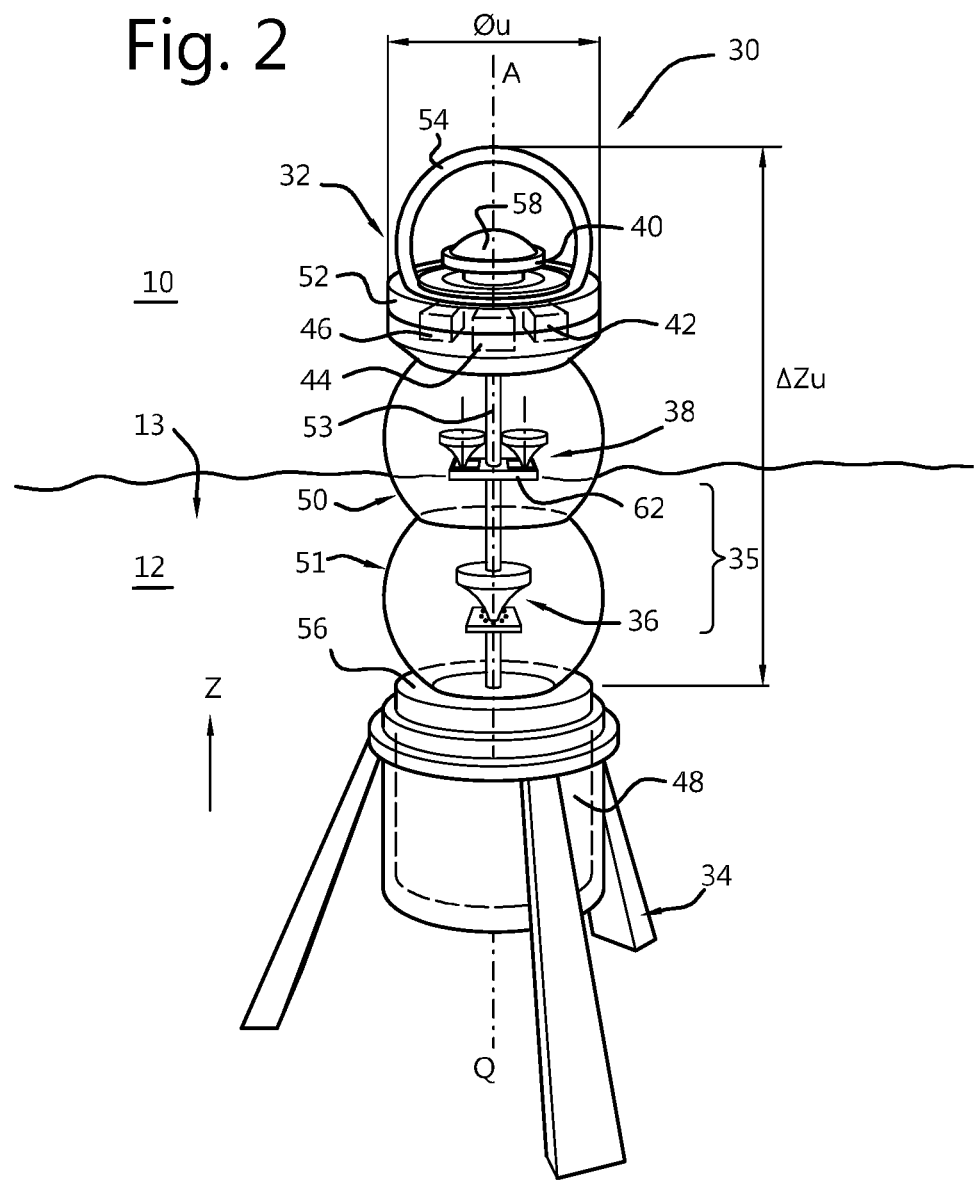
FIG. 2 presents a perspective view of an embodiment of an observation unit, deployed underwater on an submerged surface.

FIG. 2 presents a perspective view of an exemplary observation unit 30, which is part of the system 20 shown in FIG. 1, and which is deployed underwater on the submerged surface 13 (i.e. seafloor) of the seabed 12.

The observation unit 30 comprises a housing 32, which accommodates various sensors 38, 40, 42 and other electronic components 36, 44, 46, 48 in a watertight and pressure resistant manner. The housing 32 is at a lower distal portion 56 coupled to a base 34. The base 34 defines a support structure for the housing 32, and accommodates a power supply 48, which is electrically coupled to the sensors 38, 40, 42 and the other electronic components 36, 44, 46 to provide required electrical power. The base 34 further includes a support arrangement, which in this example is a tripod leg structure on a lower side, and which is adapted to support the base 34 and underwater observation unit 30 relative to the seabed 12 or structure 14, 16. In this example, the power supply 48 is formed by a replaceable seawater battery, which is known per se. The base 34 is selectively detachable from the housing 32, to allow the battery 48 to be replaced.

The housing 32 of the unit 30 includes an optically transparent medial portion 50, 51 with an optical communication device 35 inside, a component casing 52, and a transparent dome 54 with an optical imaging device 40 on an upper side of the housing 32. The medial portion 50, 51, the component casing 52, and the dome 54 jointly form an elongated body that extends along a central unit axis A. In this example, the unit 30 is essentially rotationally symmetric about the unit axis A. The medial portion 50, 51, the component casing 52, and the transparent dome 54 are essentially continuously rotationally symmetric about unit axis A, whereas other unit components have discrete rotational symmetries about axis A (e.g. the base 34 has three-fold symmetry, and the communication device 35 has two-fold symmetry).

In a deployed state of the unit 30, the unit axis A is preferably directed with a substantial component normal to the (macroscopic) orientation of the supporting submerged surface 13 or structure 14, 16, to allow the optical communication device 35 and the imaging device 40 a largest possible unobstructed FOV. Furthermore, the deployed observation units 30 project with at least the medial portion 50, 51, the component casing 52, and the transparent dome 54 above the surface 13 of the seabed 12. This allows the imaging device 40 of one unit 30 to observe the unit's surroundings and to provide the optical communication device 35 a line of sight to communication devices 35 of one or more other units 30 in the vicinity. The achievable visual and/or optical communication range between units 30 deployed underwater may be in the order of several hundreds of meters. In this example, the units 30 are relatively small; A height ΔZu of the housing 32 (from 56 to the top of dome 54) along the axis A is several tens of centimeters e.g. about 25 centimeters, and diameter Øu of the housing 32 transverse to the axis A is about 10 centimeters.

The component casing 52 forms a pressure resistant shell, which consists essentially of Titanium and defines an internal chamber for accommodating an orientation sensor 42, a processor 44, and a memory unit 46. Titanium is a strong, light, and corrosion-resistant metal. In addition, the thermal expansion coefficient of Titanium can advantageously be selected to approach or even match the thermal expansion coefficient of particular types of glass that may be used for forming the dome 54 and/or the medial portions 50, 51, to reduce differential thermal stress between these parts (and potential negative optical effects) under varying temperature conditions.

The medial portion 50, 51 is formed by a first medial portion 50 and a second medial portion 51, which are stacked along and centered on the unit axis A, and which accommodate distinct functional parts of the optical communication device 35. The communication device 35 includes an optical signal transmitter 36, and an optical signal receiver 38 of the anidolic (non-imaging) type.

The optical signal transmitter 36 includes a plurality of light sources (70, see FIG. 4), and is configured to transmit an optical data signal via light that is emitted by the light sources 70, through the second medial portion 51, and into the body of water 10 surrounding the unit 30.

The imaging device 40 is formed by a photogrammetric camera 40 with an ultra-wide field of view (UW-FOV), which is configured to acquire image data of objects located in the vicinity of the unit 30. The camera 40 is configured to detect and acquire image data of other light sources in the vicinity of the unit 70.

In this example, the camera FOV faces away from the housing 32 and upwards along the unit axis A, to ensure that portions of the housing 32 are not within the camera FOV when the observation unit 30 is deployed. In particular, the camera FOV faces away from the optical signal transmitter 36 of the optical communication device 35.

The orientation sensor 42 is configured to acquire attitude data for the unit 30, by determining at least a pitch and a roll of the underwater imaging device 40 relative to the surface 13 or structure 14, 16 on/in which the unit 30 is deployed.

The processor 44 and memory unit 46 are communicatively coupled with the orientation sensor 42, to receive and store the attitude data acquired by the orientation sensor 42. The processor and memory units 44, 46 are also coupled with the camera 40, to receive and store image data acquired by the camera 40. Furthermore, the processor and memory units 44, 46 are coupled to the communication device 35.

A cable router tube 53 is provided through the medial part 50, 51 of the housing 32 and along the unit axis A. The processor and memory units 44, 46 are electrically connected with the communication device 35, via signal conduits. In addition, the communication device 35 and other sensors 40, 42 and electronic components 44, 46 are electrically coupled to and powered by the power supply 48 via power conduits. In addition, a data port (not shown) may be provided in the base 34 or at an underside of the housing 32, which is electrically connected to the processor and memory units 44, 46 via further signal conduits. This data port may be configured for downloading measurement data and/or uploading configuration data (e.g. for upgrading firmware) once the unit is recovered from the seafloor 13. The tube 53 accommodates the various conduits and prevents optical masking of the signal transmitter and receiver 36, 38.

The processor 44 is configured to receive the image data from the camera 40, and to determine positional data of the second light source relative to the camera 40. The memory unit 46 is configured for storing the positional data with timestamps, to form a dataset of time-dependent positional data. The communication device 35 is configured to transmit the positional data to other underwater observation units 30b, 30c, 30d, a nearby underwater vehicle 18, and/or an underwater processing station.

Figure 3:
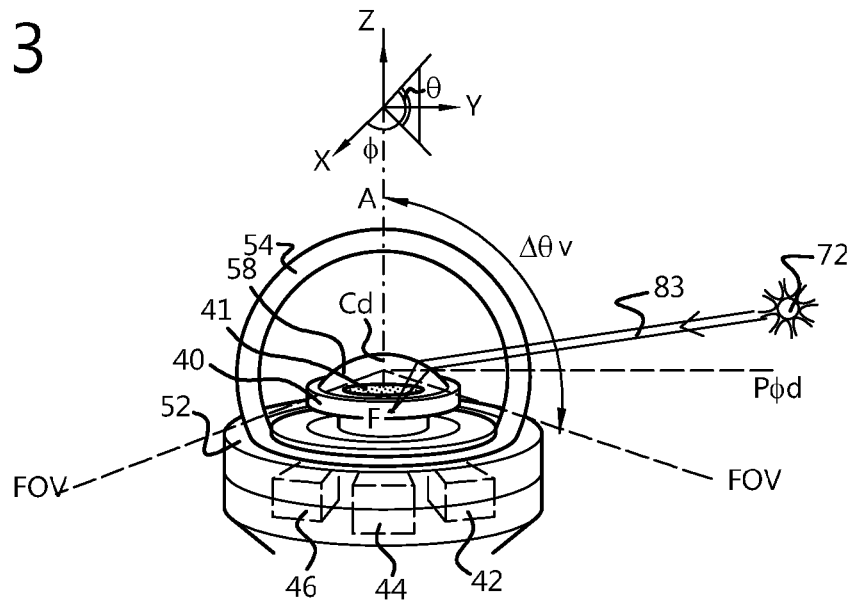
FIG. 3 shows a side view of an upper portion of the observation unit from FIG. 2.

FIG. 3 shows a schematic side view of the upper portion of the observation unit 30 from FIG. 2, including the transparent dome 54 with camera 40. The camera 40 is accommodated inside the dome 54, and includes a digital imaging sensor 41 and a fish-eye lens 58 for receiving and refracting light from the surroundings and projecting the light onto the sensor 41. The imaging sensor 41 includes a two-dimensional (2D) array of pixels.

The transparent dome 54 is formed as a hyper-hemispherical shell of optically transparent material, which is sufficiently rigid to resist considerable external pressures associated with underwater deployment without significant deformation. Exemplary materials for the dome 54 are borosilicate glasses or non-crystalline silica glasses, preferably with low coefficients of thermal expansion (e.g. in the order of $3 \cdot 10^{-6}$ $K^{-1}$ or lower).

The camera 40 is positioned with its fish-eye lens 58 substantially coinciding with a nominal center of curvature Cd of the dome 54. The spherical portion of the dome 54 extends over an azimuthal range of 360° and an elevational range that at least equals the elevational coverage $\Delta\Theta v$ of the camera's FOV.

The fish-eye lens 58 confers an omnidirectional UW-FOV to the camera 40. In this example, the camera FOV covers 360° in the azimuthal plane $P_{\varphi d}$. The camera FOV has an elevational coverage $\Delta\Theta v$ of −20° to 90° relative to the azimuthal plane $P_{\varphi d}$. The resulting UW-FOV allows instantaneous imaging of a large portion of the unit's surroundings. The UW-FOV covers a relatively narrow elevational range around the azimuthal plane $P_{\varphi d}$, in which other units 30 are expected to be located, but also larger elevational angles corresponding with an upwards region in which an underwater vehicle 18 (e.g. an ROV or UAV) may move around.

The fish-eye lens 58 has a focal length that is slightly larger than the distance to the sensor 41, so that a focal point F of an imaged light signal 83 from a point-like light source 72 will be located slightly behind the imaging sensor 41. Such a point-like light source 72 may for example correspond with the optical signal 80 from an optical signal transmitter 36 of a visible but remote other unit 30. Light received from a point-like light source 70 will thus be projected slightly out of focus onto the imaging sensor 41, to generate an image blob that extends over multiple adjacent pixels of the array, in order to allow accurate subpixel detection of center coordinates.

Figure 4:
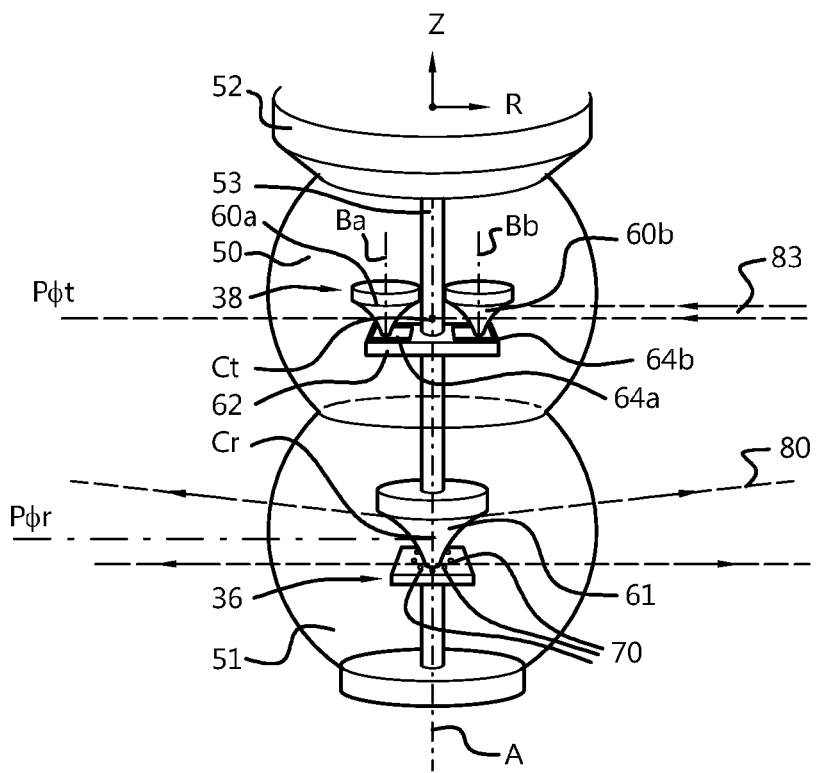
FIG. 4 shows a side view of a medial portion of the observation unit from FIG. 2.

FIG. 4 shows a schematic side view of the transparent medial portion 50, 51 of the UWOC unit 30 from FIG. 2. The medial portion 50, 51 is formed by a first medial housing portion 50 and a second medial housing portion 51. Exemplary materials for the medial portions 50, 51 are glasses or acrylic glasses. The medial housing portions 51, 52 are formed as truncated spheres that consist essentially of pressure-resistant and optically transparent material, and which are mutually stacked and coaxially arranged around the unit axis A. Each medial housing portion 51, 52 has an outer surface with a convex curvature along radial and axial directions R, Z, and an associated center of curvature Ct, Cr located on the unit axis A.

The optical signal receiver 38 is of an anidolic type. The optical signal receiver 38 is accommodated in the first medial housing portion 50, and includes a detector 62 with SiPM sensors 64a, 64b and first reflector optics 60a, 60b.

The first reflector optics 60a, 60b are positioned with volumetric center substantially coinciding with a nominal center of curvature Ct of the first medial housing portion 50. The first reflector optics 60 includes an inverse parabolic conical reflector 60a, 60b for each associated SiPM 64a, 64b. Each reflector 60 is adapted to reflect incoming light signals 83 that radially approach with a substantial component along a first azimuthal plane $P_{\varphi r}$, and to project the reflected light onto the associated SiPM 64a, 64b. The reflectors 60 are arranged inside the first medial portion 50 with two-fold (180°) rotational symmetry around the unit axis A. The axis of revolution Ba, Bb of each reflector 60 is parallel with the unit axis A, and the (possibly truncated) top of each mirror is directed toward the associated SiPM 64a, 64b.

The optical signal transmitter 36 is accommodated in the second medial housing portion 51, and includes light sources 70 and second reflector optics 61. The light sources 70 are formed by LED units that are arranged in a regular azimuthal distribution around the unit axis A, and which are adapted to emit light with wavelengths substantially in an optical range of 300 nanometers to 600 nanometers.

The second reflector optics 61 are formed by another parabolic conical reflector 61, which is adapted to reflect optical signals 80 emitted by the LEDs 70 outwards, with a substantial component along a second azimuthal plane $P_{\varphi t}$ that is parallel with the first azimuthal plane $P_{\varphi r}$. The second reflector optics 61 are positioned with its volumetric center substantially coinciding with a nominal center of curvature Cr of the second medial housing portion 51.

The processor 44 and memory unit 46 are communicatively coupled with the optical signal receiver 38 via the cable router tube 53, to receive and store data acquired by the SiPMs 64a, 64b. The processor unit 44 is also communicatively coupled with the optical signal transmitter 36 via the cable router tube 53, to control the emission of optical signals 80 by the LEDs 70.

Figure 5:
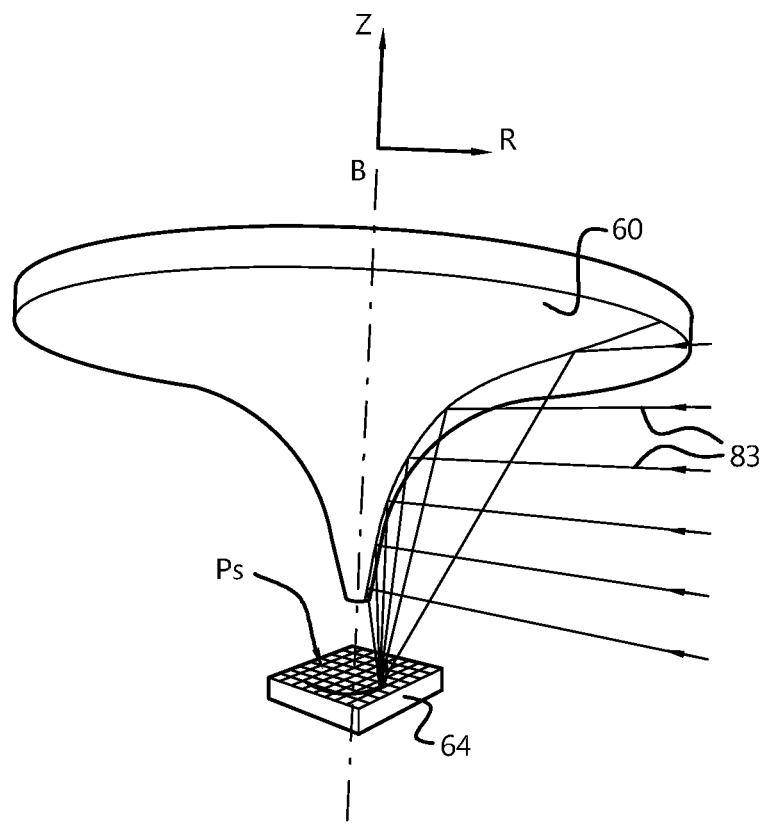
FIG. 5 presents a perspective view of another embodiment of an observation unit, deployed underwater on an submerged surface.

FIG. 5 shows a schematic perspective view of one of the conical reflectors 60a, 60b in the optical signal receiver 38. The parabolic conical reflector 60 is formed as an inverse parabolic cone with an outer surface of optically reflective material, and with an annular focal region that coincides with the planar sensor surface Ps of the associated SiPM 64a, 64b. The conical mirror 60 is centered on an axis of revolution B, which extends through the sensor region Ps of the underlying SiPM 64, and is substantially parallel with the axis A of the UWOC unit 30. The truncated top of the mirror 60 faces the SiPM 64.

A parabolic cone allows all light rays from a particular radial direction (i.e. particular value for the azimuth angle) to be projected onto a single focal point of the parabola. FIG. 5 shows radial parallel light rays of an incoming optical signal 83, and reflection thereof by the reflector 60 towards this focal point and onto the sensor surface Ps of the SiPM 64.

The parabolic conical reflector 61 of the optical signal transmitter 36 has a similar shape and will reflect optical signals 80 emitted by the LEDs 70 radially outwards. This reflector 61 is centered on an axis of revolution which essentially coincides with the axis A of the UWOC unit 30.

Figure 6A:
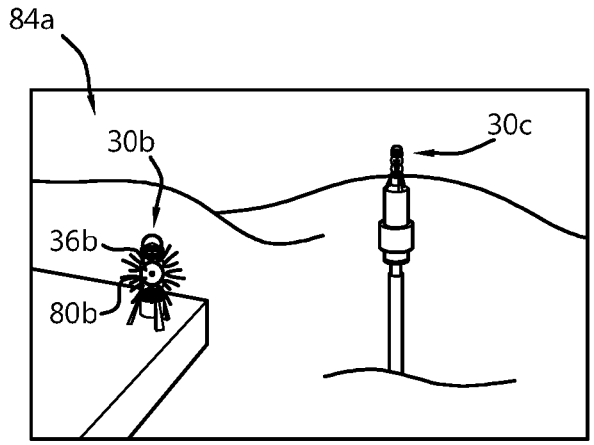
FIGS. 6a-6b illustrate an image processing method in an observation unit according to an embodiment.
Figure 6A:
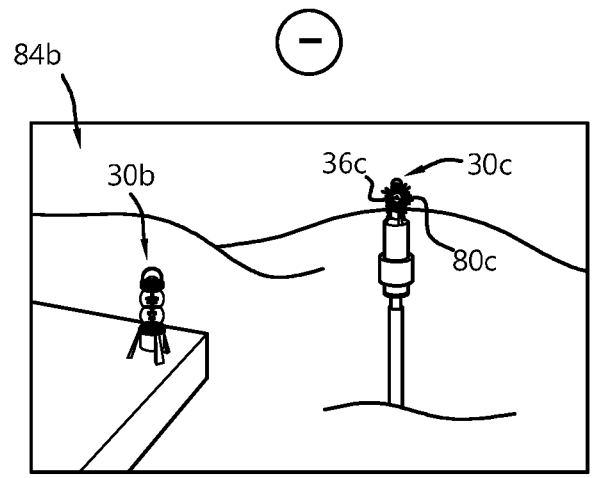
Figure 6B:
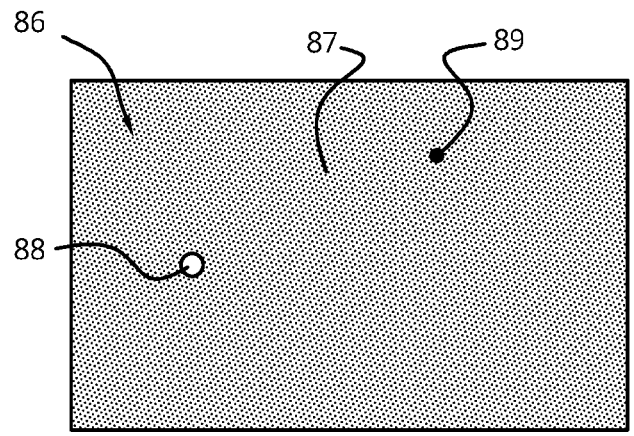

FIGS. 6a-6b illustrate an image processing method in an observation unit with an underwater imaging device, for instance unit 30a with an omnidirectional UW-FOV camera 40 as described with reference to FIGS. 1-5. FIG. 6a schematically illustrates two representations of images 84a, 84b acquired by the camera 40. It should be understood that the omnidirectional UW-FOV camera 40 will generate curved images. Rectangular 2D Cartesian coordinate frame are nevertheless used in FIGS. 6a-b, merely for illustration purposes.

Image frame 84a in FIG. 6a shows an optical signal 80b from the optical transmitter 36b of unit 30b, as perceived by the camera 40 of the observing unit 30a. Image frame 84b in FIG. 6a shows an optical signal 80c from the optical transmitter 36c of unit 30c, as perceived by the camera 40 of the observing unit 30a. Optical transmitters 36b and 36c are activated in a directly successive and temporally non-overlapping manner.

The associated optical signals 80b and 80c are imaged by the camera 40 in the successive image frames 84a-b. The processor device 44 of the observing unit 30a then subtracts the second image 84b from the first image 84a (indicated by the θ-symbol), to generate a difference image 86. This difference image 86 includes an intensity maximum 88 associated with the (angular) location of light source 36b, an intensity minimum 89 associated with the (angular) location of light source 36c, and a background region 87 with average intensity value associated with removed background information due to the subtraction.

Pixel regions where a received light signal hits the imaging sensor 41 of the camera 40 can be associated with a set of two angular coordinates (e.g. an azimuth angle φ and an elevation angle Θ, or direction cosine angles) relative to a local reference frame defined with respect to the camera 40. By subtracting images of successive light signals 80 from different units 30 in the vicinity, identification and discrimination of corresponding pixel regions can proceed with increased accuracy, and based on a relatively small number of image frames. The removal of irrelevant background image data from the subtraction operation increases the accuracy of detecting relevant pixels associated with the light signals 80.

Figure 7:
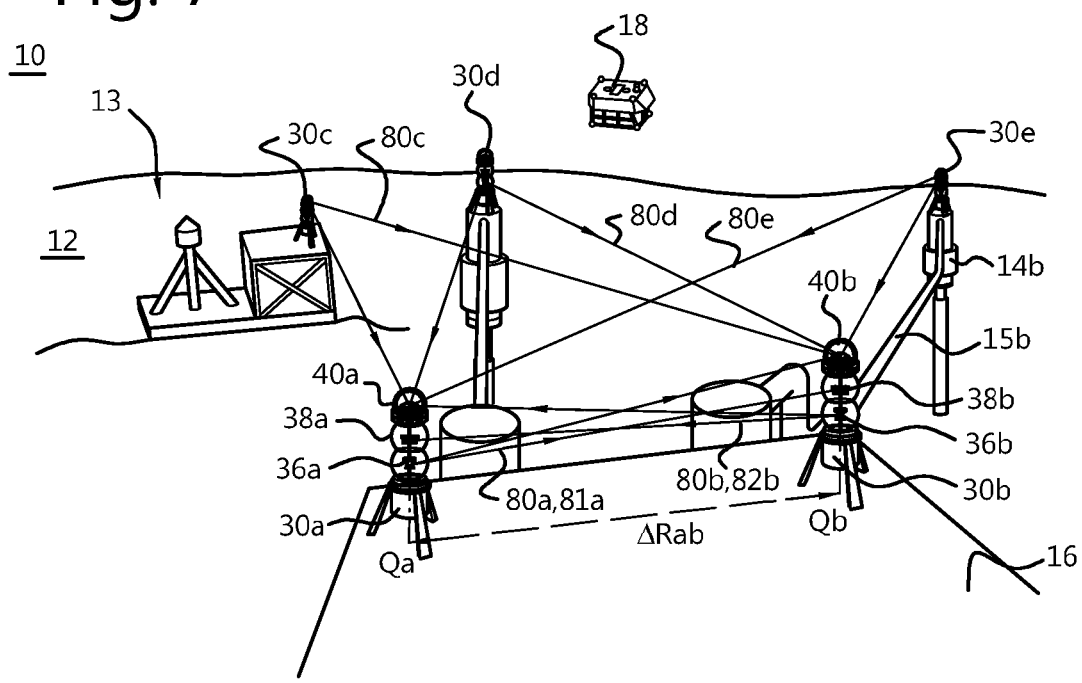
FIG. 7 illustrates a deployed observation system and a method for structure displacement monitoring according to embodiments.

A plurality of the proposed units 30 from FIGS. 2-4 can be deployed underwater to form an observation and monitoring system 20. FIG. 7 shows part of the exemplary system 20 in a deployed state, and illustrates a method for structure/asset displacement monitoring. The units 30a, 30b, 30c, 30d, 30e are configured to operate without external control, and to establish optical communication channels between pairs of units 30. The resulting communication channels may form a meshed network, wherein the units 30 form network nodes that cooperate to perform one or several observation and monitoring functions. The displacement monitoring method is explained with reference to the exemplary units 30 from FIG. 2-4, but it should be understood that equivalent units may be used as an alternative or in addition to such units 30.

In an initial deployment stage for the system 20, the observation units 30i (i=a, b, c, . . . ) are placed at non-coinciding locations Qi on the submerged surface 12 or structures 14, 16, such that each unit 30i is within visual and/or optical communication range with at least one other unit 30j (j=a, b, c, . . . ; j≠i). The relatively small units 30 may initially be placed by an underwater vehicle 18, for instance a ROV 18. The units 30 are deployed with inter-unit distances ΔRij between each pair of units 30i, 30j (e.g. ΔRab between units 30a and 30b). In a (quasi-static) displacement monitoring mode, inter-unit distances ΔRij of up to 200 meters or more may be achievable.

In order to conserve electrical power, the units 30 are configured to remain in a dormant mode for extended times, and to activate at predetermined time intervals and/or upon external request to perform measurements, to store measurement data, and/or to exchange measurement data. The processor 44 of each unit 30 is programmed with timing and/or external instruction protocols for activating the sensors 38, 40, 42 at predetermined periods and/or external request, and for storing the acquired data in the memory unit 44 and/or optically transmitting the acquired data to other units 30 in the network.

The signal transmitter 36a of a first observation unit 30a may emit light signals 80a, 81a (or 82a; not indicated in FIG. 6). The emission of light may occur continuously, intermittently after predetermined time intervals, or upon request by the ROV 18 or another nearby underwater vehicle (e.g. an UAV). A portion of this light signal 80a may be received by other cameras (e.g. 40b) of nearby observation units (e.g. unit 30b), yielding image data for each unit 30 within visual range. Via initial calibration procedures, the pixel region where a received light signal hits the imaging sensor 41 of the camera 40 can be associated with a set of two angular coordinates (e.g. an azimuth angle φ and an elevation angle Θ, or direction cosine angles) relative to a local reference frame defined with respect to the camera 40.

During imaging with the camera 40, the orientation sensor 42 of each unit 30 acquires attitude data for this unit 30, by detecting changes in at least pitch, and roll angles for the camera 40 relative to the surface 13 or structure 14, 16 on/in which the unit 30 resides. The processor 44 of each unit generates positional information with angular coordinates for the detected external light sources, on the basis of the acquired image data and attitude data. The positional information is referenced with respect to a common coordinate frame and provided with a timestamp corresponding to the time of measurement. The resulting data with timestamp is locally stored in the memory unit 46. The acquired image data and attitude data may also be separately stored in the memory unit 46, for downloading and post-processing purposes.

In addition, each of the units 30 may be configured to send optical interrogation signals 81 to another unit 30 via its signal transmitter 36, and to respond to an interrogation signal 81 received via the signal receiver 38 by emitting an optical response signal 82 via the signal transmitter 36. The processor 44 of each unit 30 may then be configured to execute a ranging function between this unit 30 and a specific other of the surrounding units that is within optical range, by determining time of flight (TOF) between the emitted interrogation signal 81 and a received response signal 82. The resulting TOF data may be stored in the memory unit 46 and/or transmitted via the communication device 35 to another unit 30. As illustrated in FIG. 7, the first unit 30a emits an optical interrogation signal 81a. The second unit 30b sends and optical response signal 82b to the first unit 30a, upon receiving the optical interrogation signal 81a from the first unit 30a. The first unit 30a measures a time difference between transmission of the interrogation signal 81a and receipt of the response signal 82b from the second UWOC unit 30b, to derive a TOF. The processor 44 of the first unit 30a then determines an inter-unit distance $\Delta Rab$ on the basis of the TOF.

Apart from the above, each unit 30 is configured to receive positional data of the other units 30 at predetermined times or upon request. The positional data is to be transmitted by each unit 30 via its communication device 35 to the other units 30. The processor device 44 of one unit 30 is configured to merge positional data (including timestamps) received from the other units 30, to form a merged dataset of time-dependent positional profiles for all observation units 30, which is stored in the memory unit 46.

The node positions can be computed from the recorded positional data (e.g. angular data and attitude data) and at least one known distance to determine the scale of the deployed system 20 (e.g. from one or more TOF-based inter-unit distances). The deployed system 20 can thus be used to accurately detect (e.g. sub-centimeter) relative motions (e.g. subsidence) between the deployed units 30, and parts of the surface 13 and assets 14, 16 on which the units 30 are deployed, by retrieving the merged dataset and analyzing the time-variations in the positional data. The method may for instance be used to estimate mechanical stresses between two locations of a submerged object (e.g. wellheads 14 and manifolds 16), or of structures (e.g. jumpers 15) interconnecting such objects, to provide a timely indication of potential structure failure.

The underwater vehicle 18 may include a wireless optical communication device (not shown), which is configured to address any unit 30 and request for a transmission of positional data. Such a vehicle 18 may move within communication range of a selected unit 30, and request the unit 30 for a transmission of network measurements. The addressed unit 30 may then upload its current merged dataset of time-dependent positional profiles to the vehicle 18.

The system 20 may additionally include an acoustic modem (not shown), configured to upload positioning data to a vehicle at the surface of the sea 10. Alternatively or in addition, one or more of the units 30 may be in signal communication via a wired connection with a nearby underwater data access point (also not shown).

Figure 8:
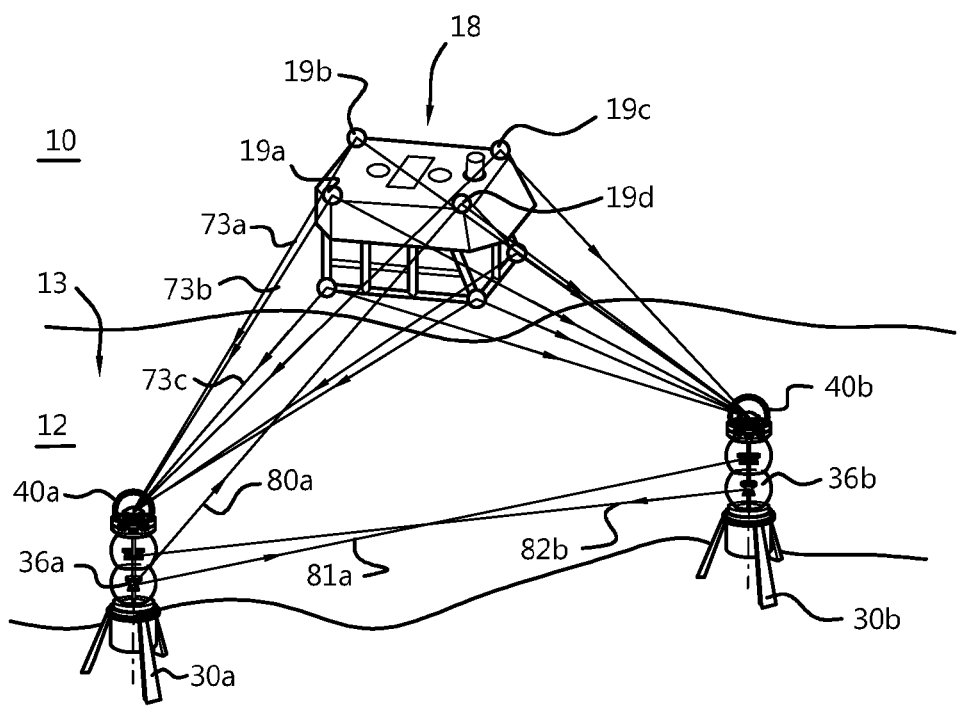
FIG. 8 illustrates a deployed observation system and a method for enhancing position information for an underwater vehicle according to embodiments.

FIG. 8 shows part of the exemplary observation system 20 from FIGS. 1-5 in a deployed state, and illustrates a method for enhancing position information for an underwater vehicle 18 e.g. an ROV. In an initial calibration stage for the deployed system 20, the observation units 30 may exchange interrogation and response signals 81, 82, in order to determine TOF and inter-unit distances $\Delta Rij$ via methods described herein above.

The ROV 18 may be fitted with a plurality of wireless optical communication devices 19, each including an optical signal transceiver that is configured to emit light 73, and to receive optical signals 80 from the signal transmitters 36 of nearby observation units 30.

The ROV 18 may be configured to serve as a master node for the system 20. This master node is configured to establish the common network time of the system 20, and to synchronize time for all the units 30 in the network by broadcasting timing information via its optical communication device to the units 30j. The master node is further configured to define tasks that individual units 30j need to execute per measurement cycle, and to transmit instructions to a specific unit 30j via communication device. Alternatively, one or several of the observation units 30 in the system 20 may be configured to function as the master node during different periods.

The underwater imaging devices 40a, 40b observation units 30a, 30b in visual range of the ROV lights 73 acquire image data of these lights 73. The processor device 44a, 44b of each unit 30 may then determine positional data associated with of the ROV relative to the imaging device 40, via methods described herein above. The communication device 35a, 35b of each unit 30 may then transmit this positional data to the ROV 18 upon request, via optical signals 80 that may be received by any or all of the ROV's communication devices 19 that have a line of sight to that unit 30. Only optical signal 80a from unit 30a to ROV communication device 19d is shown in FIG. 8 for clarity, but it should be understood that other units 30 may communicate positional information to any or all ROV devices 19.

The system 20 may be kept deployed in dormant mode on the seafloor 13 and structures 14, 16 for a long time, but may be woken up by the ROV 18 (or another underwater vehicle) entering the site, and ordered to start tracking and broadcasting the 6 DOF position of the ROV 18.

Any or all units 30 in the system 20 can also be ordered by the ROV 18 to record images of the environment with the static cameras 40 with omnidirectional views. During such recording, the ROV 18 may project light (e.g. diffuse light or laser stripes) onto the otherwise dark scene. Full panoramic image data, or landmark features extracted from those images by the units 30, may be transmitted together with positional reference data to the ROV 18 upon request.

The system 20 may be configured to operate in a single mode, and switch to another single mode upon request. The system 20 may also be configured to operate in multiple modes at the same time, and to de-activate one of the current modes and/or activate one or more other modes upon request by the ROV 18. The system 20 may thus be efficiently used for different purposes and perform alternative measurements upon request, while saving energy when particular modes of operation are not desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

In the above examples, the camera FOV had an azimuthal coverage $\Delta\phi v$ of 360° and an elevational coverage $\Delta\Theta v$ of −20° to +90°. Depending on the application and desired vertical observational range, the elevational coverage $\Delta\Theta v$ may be reduced to the range −20° to +30°, or may be increased to the range −50° to +90°.

The skilled person will appreciate that the component casing 52 may consist essentially of materials different than titanium. Other suitable materials are e.g. stainless steel, electrogalvanized steel, aluminum, or other sufficiently rigid materials that are corrosion-resistant or otherwise provided with an external coating of anti-corrosion material.

Also, the shape of the medial portions 51, 52 of the unit's housing 32 should not be considered limited to stacked truncated spheroids. Instead, a medial housing portion with a cylindrical shape, or another shape with rotational symmetry about the unit axis A, would be possible.

Furthermore, the power supply 48 was formed in the above examples as a replaceable seawater battery, but may alternatively be formed by other suitable water-compatible and pressure-resistant power supply arrangements. For instance, a pressure-tolerant non-rechargeable alkaline battery pack may be used in monitoring units for long-term deployment (e.g. long-term displacement monitoring mode), or rechargeable nickel-metal hydride (NiMh) batteries in a pressure housing may be used in monitoring units that are only deployed for a short period (e.g. in positioning mode).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. For instance, the image processing functionalities on the one hand, and the optical communication and network management tasks on the other hand, may be controlled by separate processor devices provided in the same underwater observation unit.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

LIST OF REFERENCE SYMBOLS 10 body of water (e.g. seawater)
12 submerged earth layer (e.g. seafloor, ocean floor)
13 submerged earth surface
14 submerged structure (e.g. wellhead)
15 coupling conduit (e.g. jumper)
16 further submerged structure (e.g. manifold)
18 underwater vehicle (e.g. remotely operable vehicle, unmanned autonomous vehicle)
19 vehicle light
20 underwater observation system
22 underwater beacon unit
30 underwater observation unit
32 housing
34 base
35 optical communication device
36 optical signal transmitter
38 optical signal receiver
40 underwater imaging device (e.g. photogrammetric camera)
41 imaging sensor
42 orientation sensor
44 processor
46 memory unit
48 power supply (e.g. battery)
50 first medial housing portion (e.g. first solid transparent dome)
51 second medial housing portion (e.g. second solid transparent dome)
52 component casing
53 cable router tube
54 transparent dome
56 distal housing portion
58 refractor optics (e.g. fish-eye lens)
60 first reflector optics (e.g. parabolic conical reflector)
61 second reflector optics (e.g. parabolic conical reflector)
62 optical detector
64 Silicon photomultiplier (SiPM)
66 parallel LC filter
70 light source (e.g. LED)
72 external light source
73 vehicle light signal (e.g. ROV LED)

80 light signal
81 optical interrogation signals
82 optical response signal
83 further light signal
84 image frame
86 difference image
87 background pixels
88 intensity maximum
89 intensity minimum
X first direction (longitudinal direction)
Y second direction (transversal direction)
Z third direction (vertical direction/axial direction)
R radial direction
φ first angular direction (azimuthal direction)
Θ second angular direction (elevation direction)
Δφv FOV azimuthal range
ΔΘv FOV elevation range
ΔZu unit height
Øu unit diameter
$P_{\varphi d}$ azimuthal plane (of camera dome)
$P_{\varphi t}$ azimuthal plane (of optical signal transmitter)
$P_{\varphi r}$ azimuthal plane (of optical signal receiver)
Ps sensor plane
i index for observation unit (i=a, b, c, . . . )
j further index for observation unit (j=a, b, c, . . . ; j≠i)
Cd dome center
Ct first center of curvature (e.g. at/near optical signal transmitter)
Cr second center of curvature (e.g. at/near optical signal receiver)
Ai nominal unit axis (of unit i)
Qi unit position (of unit i)
ΔRij inter-unit distance (from unit i to j)

The invention claimed is:

1. An observation unit for underwater deployment on or in a submerged earth layer or a submerged structure, comprising:
   a housing adapted for supporting the observation unit relative to the submerged layer or structure;
   a first light source fixed to the housing, and configured to emit light into the surroundings of the observation unit;
   an underwater imaging device attached to the housing, and configured to acquire image data of a second light source located within a wide field of view, FOV, covering the surroundings of the observation unit;
   a processor device configured to receive the image data from the underwater imaging device, and to determine positional data of the second light source relative to the underwater imaging device,
   a memory unit for storing the positional data with timestamps, to form a dataset of time-dependent positional data, and
   a communication device configured to transmit the positional data to at least one of: another underwater observation unit, an underwater vehicle, and an underwater processing station.

2. The observation unit according to claim 1, wherein the communication device comprises an optical signal transmitter, and wherein the first light source is part of the optical signal transmitter, which is configured to emit a data signal via the emitted light into the surroundings of the observation unit.

3. The observation unit according to claim 1, comprising an orientation sensor configured to determine attitude data including at least a pitch and a roll of the underwater imaging device relative to a submerged surface or structure when the observation unit is in a deployed state.

4. The observation unit according to claim 1, wherein the underwater imaging device is formed by an omnidirectional photogrammetric camera with an ultra-wide FOV.

5. The observation unit according to claim 4, wherein the housing is centered on a nominal axis A, and the underwater imaging device is located on one distal portion of the housing, with its FOV facing away from the submerged surface or structure when the observation unit is in a deployed state.

6. The observation unit according to claim 4, wherein the ultra-wide FOV of the omnidirectional photogrammetric camera has an azimuthal coverage of 360° and an elevational coverage of at least −20° to +30°.

7. The observation unit according to claim 1, wherein the first light source comprises at least one LED that is adapted for emitting light with wavelengths substantially in a range of 300 nanometers to 600 nanometers.

8. The observation unit according to claim 1, wherein the underwater imaging device comprises:
   an imaging sensor with a two-dimensional, 2D, array of pixels, and
   refractor optics, with a focal length that slightly exceeds a distance to the imaging sensor, such that point-like light from the second light source that is located within the wide FOV of the underwater imaging device but at a location remote from the observation unit, is imaged out of focus to generate a blob that extends over multiple adjacent pixels of the array.

9. The observation unit according to claim 1, wherein the underwater imaging device is configured to acquire further image data of a third light source located within the FOV of the underwater imaging device;
   wherein the second light source and the third light source are activated in a directly successive but at least partially non-overlapping manner;
   and wherein the processor device is configured to receive the image data and further image data from the underwater imaging device, and to subtract the image data from the further image data or the further image data from the image data, to generate distinguishable image intensity extrema for the second and third light sources while reducing or eliminating background information.

10. An underwater observation system, comprising:
    a first observation unit and a second observation unit for underwater deployment at a first location and a second location on or in a submerged earth layer or structure;
    wherein a communication device of the first observation unit or the second observation unit is configured to receive positional data of both the first and second observation units, and wherein a processor device of the first observation unit or the second observation unit is configured to merge received positional data with timestamps, to form a dataset of time-dependent positional profiles for both the first and second observation units.

11. The underwater observation system according to claim 10, wherein a memory unit of the first observation unit or the second observation unit is configured to store the dataset of time-dependent positional profiles;
    and wherein the communication device of the first observation unit or the second observation unit is configured to transmit the dataset of time-dependent positional profiles to an underwater vehicle or an underwater processing station upon request.

12. The underwater observation system according to claim 10, wherein an underwater imaging device of at least one of the first observation unit and the second observation unit is configured to acquire further image data of vehicle light sources provided on an underwater vehicle located within the a wide FOV of the underwater imaging device;

wherein the processor device of the first observation unit or the second observation unit is configured to receive the further image data from the underwater imaging device, and to determine further positional data of the underwater vehicle relative to the underwater imaging device;

and wherein the communication device of the first observation unit or the second observation unit is configured to transmit the further positional data to the underwater vehicle upon request.

13. The underwater observation system according to claim 10, wherein an underwater imaging device of at least one of the first observation unit and the second observation is configured to acquire panoramic image data of surrounding objects in the wide FOV of the underwater imaging device;

wherein the processor device of the first observation unit or the second observation unit is configured to receive the panoramic image data from the underwater imaging device;

and wherein the communication device of the first observation unit or the second observation unit is configured to transmit at least part of the panoramic image data to the underwater vehicle upon request.

14. The underwater observation system according to claim 10, wherein the first and second observation units are configured to operate, upon request by a nearby underwater vehicle, in at least one mode selected from:

a first operational mode, wherein the communication device of the first observation unit or the second observation unit receives positional data of both the first and second observation units, and wherein the processor device of the first observation unit or the second observation unit merges received positional data with timestamps, to form a dataset of time-dependent positional profiles for both the first and second observation units;

a second operational mode, wherein the underwater imaging device acquires further image data of vehicle light sources on the underwater vehicle, wherein the processor device receives the further image data from the underwater imaging device, and determines further positional data of the underwater vehicle relative to the underwater imaging device, and wherein the communication device of the first observation unit or the second observation unit transmits the further positional data to the underwater vehicle, and a third operational mode, wherein the underwater imaging device acquires panoramic image data of surrounding objects in the wide FOV of the underwater imaging device, and wherein the communication device transmits the panoramic image data to the underwater vehicle.

15. A method for monitoring a spatial profile of a submerged surface or structure in time, using an underwater observation system, the method comprising:

deploying first and second observation units underwater at non-coinciding first and second positions on or along the submerged surface or structure, followed by: emitting a first light signal with a first light source of the first observation unit towards the second observation unit;

acquiring first image data of the first light signal with a second underwater imaging device of the second observation unit;

emitting a second light signal with a second light source of the second observation unit towards the first observation unit;

acquiring second image data of the second light signal with a first underwater imaging device of the first observation unit;

determining first positional data of the second light source relative to the first underwater imaging device, and second positional data of the first light source relative to the second underwater imaging device, and storing the first and second positional data with timestamps, to form a dataset of time-dependent positional data.

16. A method for using an observation unit including an underwater imaging device with a digital imaging sensor, the method comprising:

providing the underwater imaging device with refractor optics with a focal length that slightly exceeds a distance to the imaging sensor;

acquiring image data by imaging a point-like light from a light source that is located within an FOV of the underwater imaging device out of focus, to generate a blob in the image data that extends over multiple adjacent pixels of a 2D pixel array of the imaging sensor;

identifying a center of the blob relative to the 2D pixel array, and determining sub-pixel coordinates for the center of the blob, representative of an angular position of the light source relative to the imaging sensor.

17. A method for using an observation unit including an underwater imaging device with a digital imaging sensor, the method comprising:

activating a second light source located within an FOV of the underwater imaging device, and acquiring image data of the second light source with the underwater imaging device;

activating a third light source located within the FOV of the underwater imaging device, and acquiring further image data of the third light source with the underwater imaging device, wherein the second light source and the third light source are activated in a directly successive but at least partially non-overlapping manner, and subtracting the image data from the further image data or the further image data from the image data, thereby generating distinguishable image intensity extrema for the second and third light sources while reducing or eliminating background information.

* * * * *